W. E. SPARKS & J. H. SHAW.
LOCK.
APPLICATION FILED MAR. 24, 1906.

995,729.

Patented June 20, 1911.

Witness
J. S. Coleman
A. E. Cooper.

Inventors
William E. Sparks
and John H. Shaw
by Beach & Fisher
Attorneys

W. E. SPARKS & J. H. SHAW.
LOCK.
APPLICATION FILED MAR. 24, 1906.

995,729.

Patented June 20, 1911.

Witnesses
J. S. Coleman
A. E. Cooper.

Inventors
William E. Sparks
and John H. Shaw
by Beech Fihn,
Attorneys.

W. E. SPARKS & J. H. SHAW.
LOCK.
APPLICATION FILED MAR. 24, 1906.

995,729.

Patented June 20, 1911.

UNITED STATES PATENT OFFICE.

WILLIAM E. SPARKS AND JOHN H. SHAW, OF NEW HAVEN, CONNECTICUT, ASSIGNORS TO SARGENT & COMPANY, OF NEW HAVEN, CONNECTICUT, A CORPORATION OF CONNECTICUT.

LOCK.

995,729.  Specification of Letters Patent.  Patented June 20, 1911.

Application filed March 24, 1906. Serial No. 307,905.

*To all whom it may concern:*

Be it known that we, WILLIAM E. SPARKS and JOHN H. SHAW, both of the city and county of New Haven and State of Connecticut, have invented new and useful Improvements in Locks, of which the following is a full, clear, and exact description, when taken in connection with the accompanying drawings, which form a part thereof, and in which—

Figure 1 represents a side elevation of the escutcheon plate on the inside of the door, and which contains the principal operating parts of a lock containing the invention, Fig. 2, an inner or reverse view of this escutcheon plate, showing the principal operating parts in their normal positions, Fig. 3, a similar view with latch bolt protracted, and the safety catch retracted, and some of the other parts in different positions, Fig. 4, a similar view with the latch bolt retracted, Fig. 5, an inner or reverse view of the escutcheon plate on the outside of the door, Fig. 6, a transverse central vertical section through the lock on line 6—6 of Fig. 2, Fig. 7, a front view of the lock, Fig. 8, a top view of the lock, Fig. 9, a horizontal section through the latch bolt and safety catch on line 9—9 of Fig. 7, Fig. 10, a reverse view of the releasing slide, Fig. 11, a view of the movement plate and operating parts located thereon, Fig. 12, a similar view with some of the parts shown in section on line 12—12 of Fig. 6, Fig. 13, a similar view with the parts in the positions shown in Fig. 3, Fig. 14, a transverse horizontal section through the knobs and spindle, Fig. 15, a detail inner view of a part of the outside escutcheon plate, and the end of the neck of the knob, and Figs. 16 and 17, similar views with the compensating disk in the end of the neck of the knob shown in different positions.

In all figures, similar letters of reference represent like parts.

This invention relates to locks, and has for its object the production of a lock embodying the several improvements and combinations of parts set forth and claimed hereinafter.

Referring to the drawings for a more particular description, the parts designated by the letter A represent the escutcheon plate of the lock, adapted to be placed on the inner side of the door, and B represents the escutcheon plate for the outer side of the door.

The two escutcheon plates are secured together and to the door as follows: On the inner side of the escutcheon plate B are sockets C, internally screw threaded, for engagement by screws D adapted to pass through corresponding sockets E on the inside of the escutcheon plate A and through the door. Sleeves or tubes F extend through the door and fit over the sockets C and E and the screws D. By means of the screws, the two escutcheon plates A and B are drawn toward each other to fit snugly against opposite sides of the door. It is only necessary in order to secure the plates to the door that the requisite number of circular perforations of proper diameter be made in the door, at proper places, to permit the sleeves F to extend through them.

The operating mechanism for the latch bolt is contained in the escutcheon plate A on the inside of the door, and is shown mounted on a plate G, which is removable from the escutcheon plate, but is secured thereto by means of screws H, or other suitable means. The mounting plate G is provided with a lateral offset I, at the front edge of which is secured the face plate J, so that the face plate is formed independent of, and is removable from the escutcheon plate with the mounting plate G. By this construction, the operating parts adapted to be mounted on the mounting plate may be formed of a standard size, while the form and size of the escutcheon plate to which the mounting plate is secured may vary. In this manner the same operating parts may be used with any desired form of escutcheon plate (without the necessity of fitting them individually to the escutcheon plate,) by merely securing the mounting plate to the escutcheon plate.

Figures 5, 6, 14, 15:
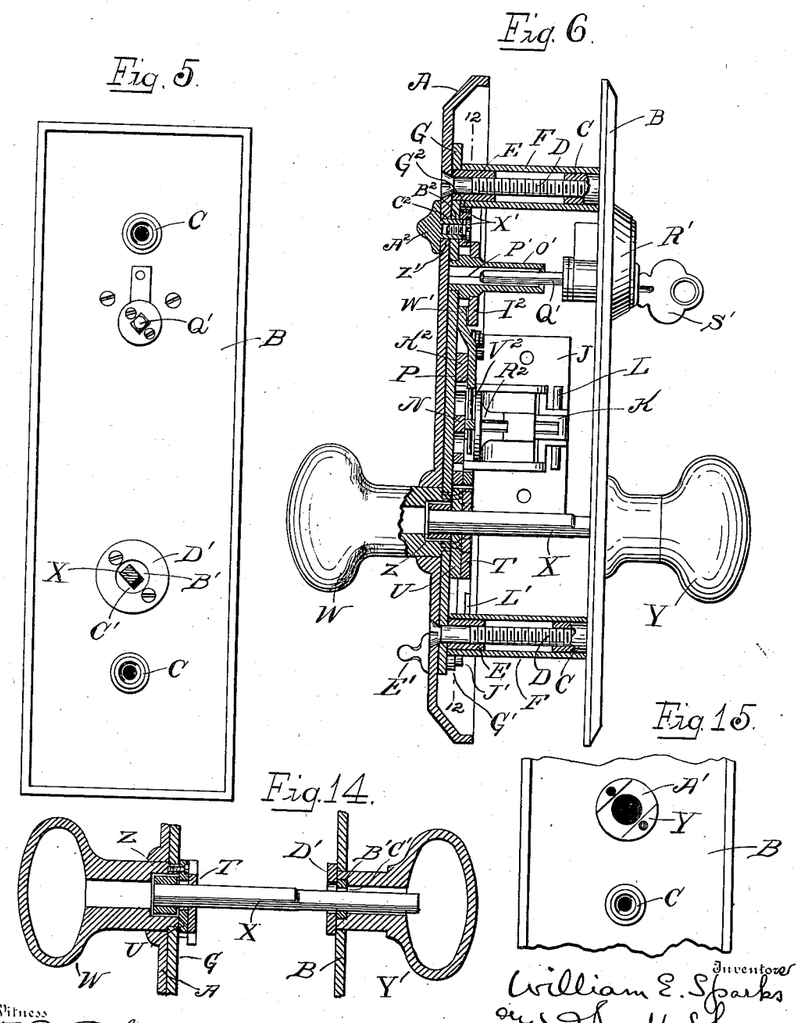
Figures 7, 11:
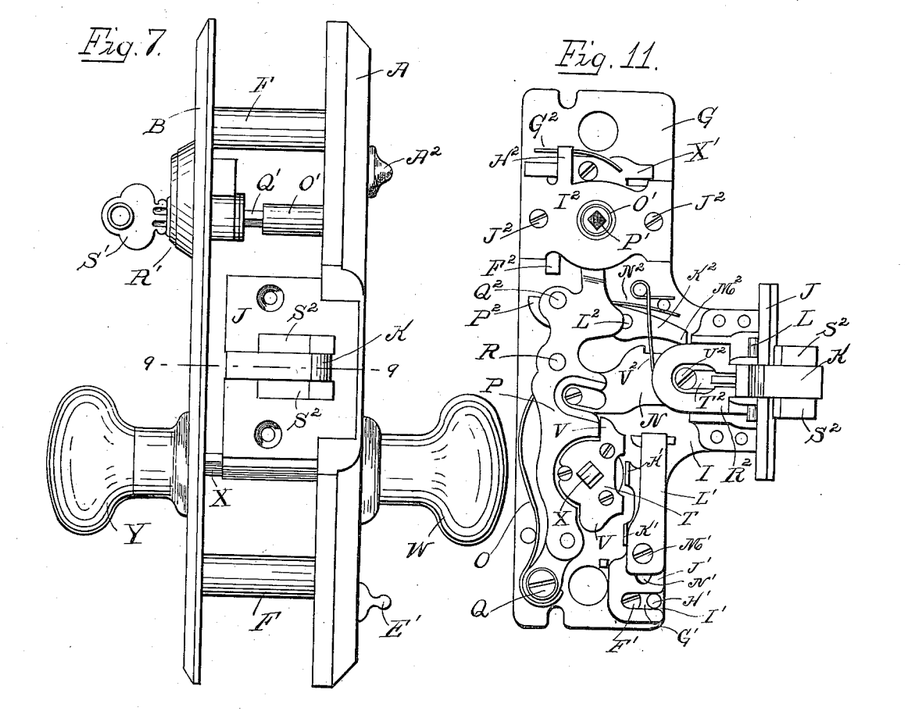
Figure 9:
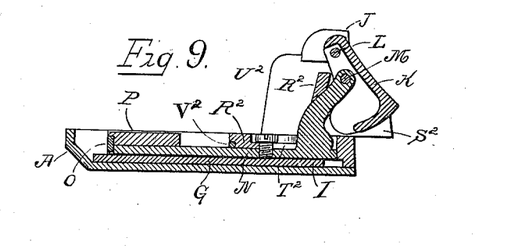

K designates a latch bolt, which is pivoted to the face plate by means of a fulcrum pin L, as shown more particularly in Figs. 6 and 9. To the latch bolt is pivotally connected by means of a pin M, a sliding piece N on the mounting plate G. The sliding piece N is normally held in its protracted position (Figs. 2, 3, 9, 11, 12 and 13) by means of a spring O on the mounting plate G, which bears against the rear end of the piece N. A lever P pivotally mounted at Q to the mounting plate G has a depending stud R adapted to project into an opening S in the sliding piece N. The opening S is slightly larger than the diameter of the stud R, so that the stud is capable of a limited movement in the opening.

The lever P is rotated on its pivot by means of the offsets or wings V on either of the rotary plates T or U, which form a divided hub operated by the knobs of the lock. The neck of the knob W on the inside of the door is connected by screws directly to the plate U, as shown more particularly in Figs. 6, 12, 13 and 14. (The upper plate T is shown removed in Figs. 12 and 13). The spindle X of the knob Y on the outer side of the door is rigidly connected with the plate T, so that they will rotate together. The end of the spindle projects through the plate U (Figs. 6, 12, 13 and 14) in which it is free to rotate, and has at its outer end a collar Z which holds the plate U on the spindle, so that as shown more particularly in Fig. 14, upon loosening the screws which secure the plate U to the neck of the knob W, both plates T and U of the hub may be removed with the spindle. By this means, the inside knob is readily detachable from the hub plates that remain secured to the spindle, the other end of which is adapted to be connected with the outside knob.

Figure 16:
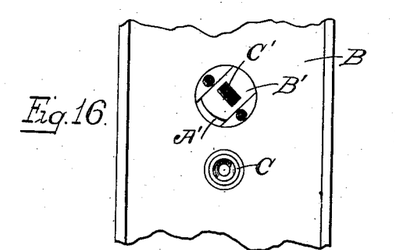
Figure 17:
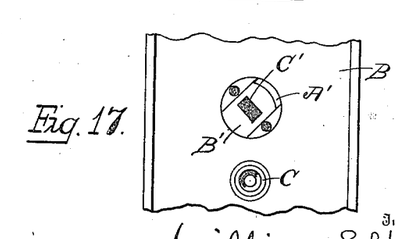

In order to provide a ready adjustment of the outside knob which would compensate for any inaccuracy in assembling the parts of the lock, the neck of the knob is provided at its inner end, as shown more particularly in Fig. 15, with a transverse recess A', in which is adapted to fit a sliding disk B', having a rectangular opening C', elongated as shown in a direction at right angles to the line of movement of the disk. A ring or washer D' is adapted to fit over and be secured to the inner end of the knob Y and hold the parts in place (Figs. 5 and 14). The squared or rectangular end of the spindle is adapted to fit into the opening C', and if the spindle is not in exact alinement with the axis of the knob and neck any inaccuracy will be taken up either by the elongated opening C' in the disk B', or by the movement of the disk B', as suggested in Figs. 16 and 17, in the groove A' of the neck of the knob.

Figure 1:
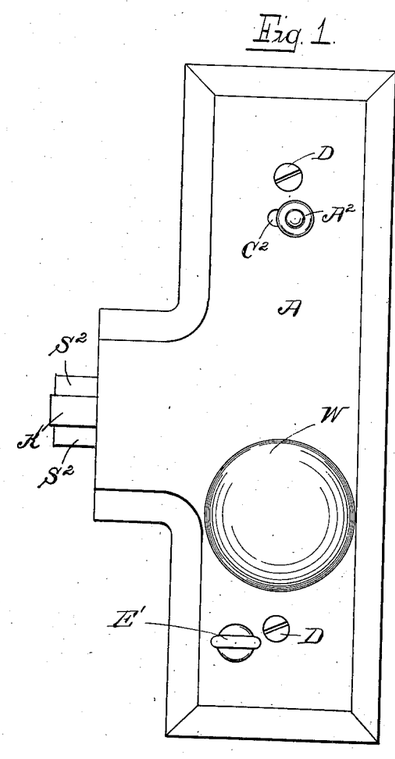
Figure 2:
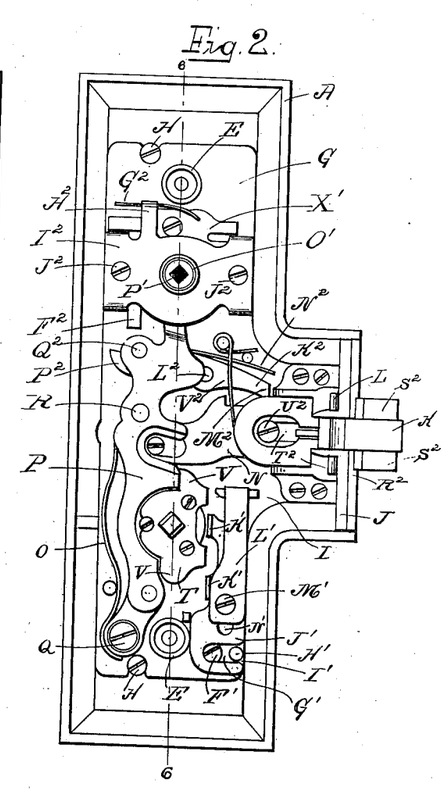

Projecting through the escutcheon plate A and mounting plate G is a shank of a turn button E', which, as shown in Figs. 1 and 6, is on the escutcheon A on the inner side of the door. Secured to the end of the shank by a screw F', or other means, to rotate therewith, is a disk G' carrying a stud H', which stud takes into a slot I' on the end of a sliding plate J'. The plate J' has two surfaces or bearings K', which are adapted, when the plate is pushed upward in the position shown in Fig. 3, to bear against the part T of the divided hub, to prevent its rotation. A flat spring L' bears on the sliding plate J' and is secured to the mounting plate by means of a screw M' projecting through a slot N' in the sliding plate J', as shown more particularly in Figs. 12 and 13. By this construction, when the turn button E' is turned in one position, the part T of the divided hub is prevented from rotation (Figs. 3 and 13), and as the divided hub is rotated by the spindle X, connected as above shown to the outer knob Y the turn button E' on the inner side controls the operation of the outer knob. The turning of the button E' to the position shown in Figs. 1, 2, 4, 11 and 12 releases the knob to operate the latch through the divided hub plate T.

O' designates a post rotatably mounted on the mounting plate G (Fig. 6) and provided with a rectangular perforation P' for the pin or spindle Q' of a cylinder lock R'. The cylinder lock R' may be of any desired construction and is adapted to be operated by a key S'. The rotary post O' is provided with a plate T', having a straight edge U' and a laterally projecting finger V', which finger is adapted to engage the extreme end W' of the lever P, so that when the post O' is rotated by the pin Q' of the cylinder lock, the finger V' will swing the lever P on its pivot to retract the latch bolt K. By this construction the latch bolt may be retracted from the outside by means of the key S' when the outside knob Y' is locked against rotation by means of the sliding plate J' and turn button E'. A plate X' is secured by a screw, or other means, to the shank Z' of a button A$^2$ on the escutcheon A on the inner side of the door. The shank Z' projects through slots B$^2$ and C$^2$ in the mounting plate G and escutcheon plate A, respectively, so that the shank Z' and button A$^2$ and plate X' are capable of a limited sliding movement from the position shown in Figs. 2 and 12 to that shown in Figs. 3 and 13. The plate X' is cut away at D$^2$ so that when it is in the position shown in Figs. 2 and 12, the plate T' and the post O' may be rotated, but when it is in the position shown in Figs. 3 and 13, the edge E$^2$ will engage the edge U' of the plate T' and prevent the rotation of the latter. The plate X' is provided with a laterally projecting finger F$^2$ adapted to engage the end W' of the lever P on the opposite side from the finger V' of the plate T' when the plate X' is in the position shown in Figs. 3 and 13, so that when the lever P is rotated on its pivot by means of the knob, or upon the retraction of the latch bolt K, the projection F$^2$ will be engaged by the end W' of the lever P and the plate X' pushed to its other position shown in Figs. 2 and 12, wherein the plate T'' is released, so that the plate T' and the post O' may be rotated from the cylinder lock R'. This construction enables a person on the inside of the door to lock the latch bolt K against retraction by the operation of the cylinder lock R' by merely pushing the button A² and sliding the plate X' into the position shown in Figs. 3 and 13. But if the latch bolt K is retracted by means of the knob, or in the ordinary operation of closing the door, the plate X' will be returned to the position shown in Figs. 2 and 12, wherein the plate T' is released, so that the latch may be operated from the lock R', as above described. A person may, therefore, lock the door effectively against anyone on the outside, but upon going out the ordinary operation of closing the door will release the actuating parts connected with the cylinder lock, as above described, so that the door may be unlocked by the key. The plate X' is held from accidental movement by means of a spring G² which engages a finger H² of a cover plate I², secured by screws J², or other means, to the mounting plate G. The cover plate I² holds the plate T' and post O' in position on the mounting plate G (Fig. 6).

Figure 12:
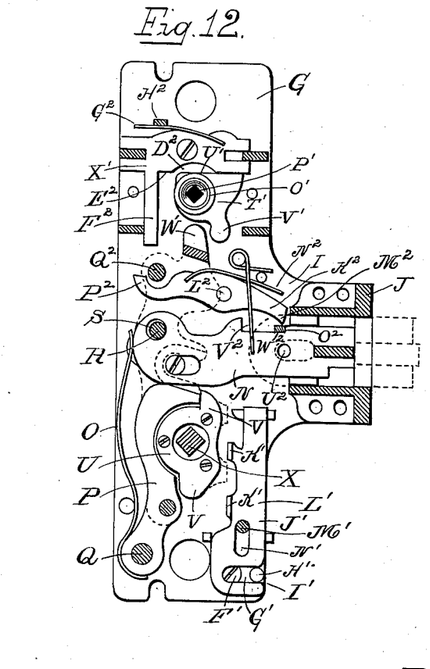

A catch lever K² is pivotally mounted on a post L² on the mounting plate G, and has one end M² normally held by a spring N² in engagement with a notch or shoulder O² on the sliding piece N of the latch bolt K (Fig. 13), which engagement prevents the retraction of the sliding piece N and the latch bolt K. The opposite end P² of the lever K² is adapted to be engaged by a depending stud Q² on the lever P so that when the lever P is swung on its pivot (Fig. 4) to retract the latch bolt, the stud Q² will engage the end P² of the lever K² to swing the end M² out of engagement with the shoulder O² of the sliding plate N. As has already been pointed out, the stud R of the lever P has a limited movement in the opening S in the sliding piece N, so that the lever P is capable of a slight movement on its pivot Q, during which movement it swings the lever K², as above pointed out, before it begins to retract the sliding piece N and the latch bolt K. The relations between the stud Q² and R and their associated parts are shown in Figs. 12 and 13, wherein the portion of lever P above the line of the section is indicated by dotted lines.

Figure 10:
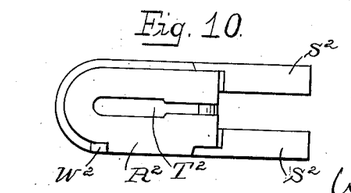

A releasing slide R² is mounted on the sliding piece N and is forked at one end, so that its prongs S² may project through the face plate J on either side of the latch bolt K. The releasing slide R² is provided with a slot T², through which projects a screw U² secured to the sliding piece N. A portion of the releasing slide R², as shown in Fig. 9, bears against the rear of the screw U² on the sliding piece N to which the latch bolt K is pivoted, so that when the sliding piece N is retracted it will retract the releasing slide R² at the same time. But the releasing slide R² is capable of retraction independently of the sliding piece N. (See Figs. 3 and 13, in which latter figure, the releasing slide is indicated in dotted lines). A spring V² normally tends to hold the releasing slide R² in its protracted position. On the under side of the releasing slide R² is a depending lug W², (shown in Figs. 10, 12 and 13) which is adapted, when the safety catch is in its protracted position (Fig. 12) to engage the end M² of the lever K² and hold it away from the shoulder O² of the sliding piece N, but when the releasing slide R² is retracted independently of the sliding piece N and latch bolt K (Fig. 13) the lug W² is away from the end M² of the lever K², so that the end M² will engage with the shoulder O² of the sliding piece N to prevent its retraction except my means of the lever P, which, as already shown, will disengage the lever K².

Figure 3:
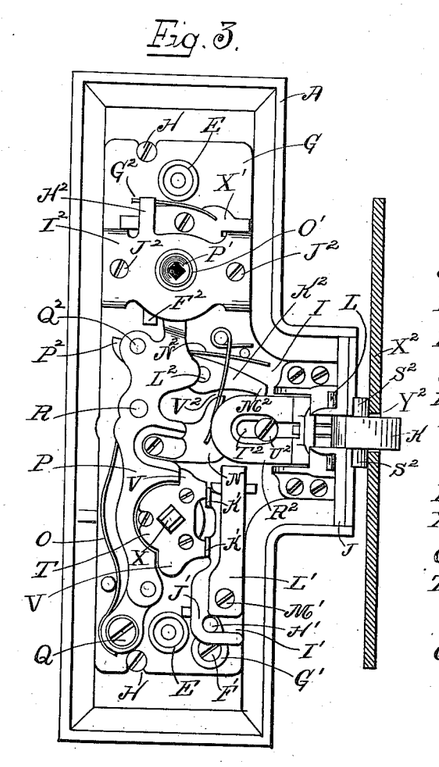
Figure 4:
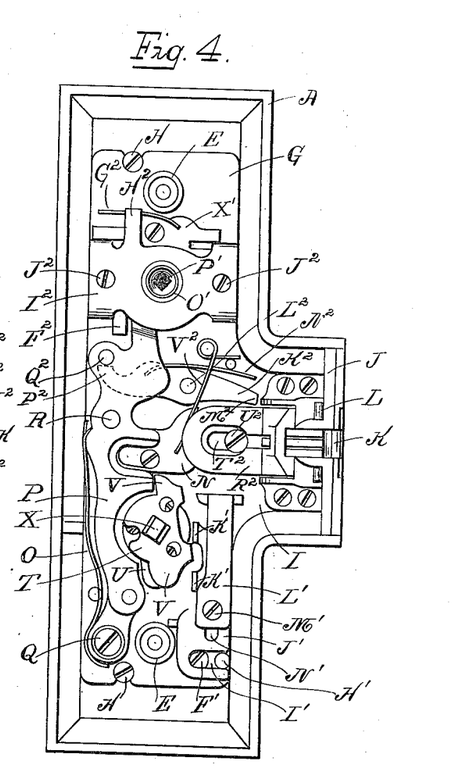
Figure 13:
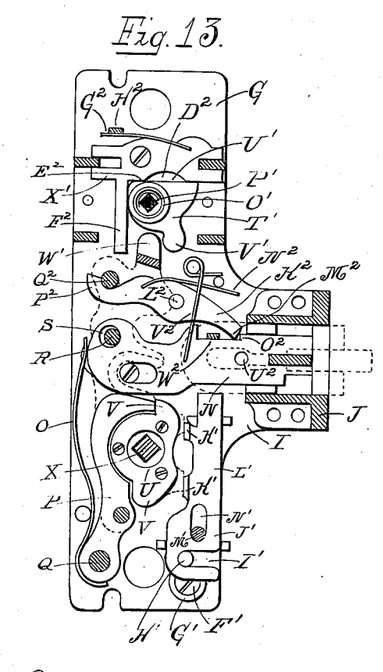

The keeper X² for the lock is provided with an opening Y² large enough to admit the latch bolt K when the door is closed, but not the prongs S² of the safety catch R², so that when the door is closed, the latch bolt K may project through the opening Y² of the keeper X², but the releasing slide R² will be retracted, as shown in Fig. 3 and 13. In this position, as already pointed out, the end M² of the lever K² will engage the shoulder O² on the sliding piece N, and, therefore, the latch bolt is prevented from being retracted by pressure on it directly and can only be retracted through the lever P. By this means, any attempt to force the latch bolt out of its keeper by inserting a knife, or other article, between the door and door jamb is prevented.

Figure 8:
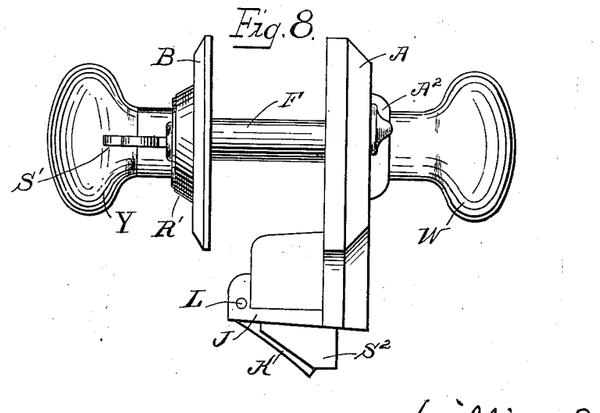

By having the releasing slide R² slide, and the latch bolt K rotate on a pivot, the movement of the releasing slide is on a line tangential to the arc described by the rotation of the latch bolt, and, therefore, the farther the latch bolt and safety catch are protracted and project from the face plate, the greater the divergence between the under edge of the prongs S² of the releasing slide and the under edge of the latch bolt K (Figs. 8 and 9). This will take up any shrinkage, and the same degree of accuracy in the relation between the latch bolt and its keeper is not required as if both of these parts rotated.

Having now described our invention, which may vary in its details without departing from the spirit thereof, what we claim and desire to secure by Letters Patent, is:—

1. In a lock, the combination with an escutcheon plate; of a face plate adapted to be applied to the edge of the door; and a mounting plate adapted to be secured within said escutcheon plate and carry the operating mechanism for said latch bolt between said escutcheon plate and the side of the door to which said escutcheon plate is attached, substantially as described.

2. In a lock, the combination with an escutcheon plate; of a face plate adapted to be applied to the edge of the door and separate from the escutcheon plate; a latch bolt projecting through said face plate; and a mounting plate connected to the face plate and adapted to be secured to the escutcheon plate and carry the operating mechanism for said latch bolt between the escutcheon plate and the side of the door to which said plate is attached, substantially as described.

3. In a lock, the combination with a knob; of the knob spindle formed angular in cross section; a plate secured to said knob, capable of a limited sliding movement in a plane tranverse to the axis of said knob and provided with an angular perforation for said spindle, substantially as described.

4. In a lock, the combination with a knob; of the knob and spindle formed angular in cross section; a plate secured to said knob capable of a limited sliding movement in a plane transverse to the axis of said knob and provided with a rectangular oblong perforation for said spindle, said perforation being shorter in a direction of movement of said plate, substantially as described.

5. In a lock, the combination with a knob, having a transverse groove on the end of its neck; a plate adapted to slide in said groove; a rectangular oblong perforation in said plate with its greater width in a line at right angles to the line of movement of said plate; and a spindle angular in cross section and of less diameter than the wider sides of said perforation, substantially as described.

6. In a lock, the combination with the latch bolt; of a device for retracting said latch bolt; a hub or roll-back for actuating said device mounted on the inner escutcheon plate; a knob spindle angular in cross section rigidly secured to said roll-back or hub so that it is incapable of longitudinal or rotary movement independently thereof; and an outer knob having an opening angular in cross section for said spindle and rotatable therewith, substantially as described.

7. In a lock, the combination with the latch bolt; of a device for retracting said latch bolt; a single knob spindle; and a divided hub or roll-back for actuating said device mounted on said knob spindle, both portions of said hub being secured against longitudinal movement on said spindle while one portion is capable of independent rotary movement, substantially as described.

8. In a lock, the combination with the latch bolt; of a device for retracting said latch bolt; a knob spindle; a divided hub or roll back for actuating said device, one portion of which is rigidly secured to said spindle and the other portion to the other knob; and means for securing said latter portion to said spindle against longitudinal movement independently thereof, substantially as described.

9. In a lock, the combination with the latch bolt; of a device for retracting said latch bolt; a knob spindle; a divided hub or roll back for actuating said device; one portion of which is rigidly secured to said spindle and the other portion to the other knob; means for securing said latter portion to said spindle against independent longitudinal movement; and a sliding connection between said spindle and its knob both being adapted to rotate together, substantially as described.

10. In a lock, the combination with the latch bolt; of a device for retracting said latch bolt; a divided hub for actuating said device; a knob spindle projecting through said hub, one portion of which is rigidly secured to said spindle to rotate therewith, and the other portion loosely mounted thereon; and a collar for preventing the loosely mounted portion of said hub from becoming detached from said spindle, substantially as described.

11. In a lock, the combination with the latch bolt; of a device for retracting said latch bolt; a rotary hub for actuating said device; a stop slidable on a line tangential to the arc described by the rotation of said hub; operating surfaces on one side of said stop adapted to engage the hub to check its rotation; and a rotary member accessible from the inside of the lock to operate said sliding stop, substantially as described.

12. In a lock, the combination with a pivoted latch bolt; of retracting mechanism for said bolt within the lock; a safety catch for preventing the retraction of said bolt disengaged therefrom upon the operation of said retracting mechanism; and a member adapted to disengage said safety catch when protracted adapted to slide on a line tangential to the arc of rotation of the latch bolt, substantially as described.

13. In a lock, the combination with the casing; of a latch bolt pivoted in said casing; a sliding member adapted to actuate said latch bolt; a safety catch for preventing the retraction of said sliding member; and a bolt adapted when protracted to disengage said safety catch and adapted to slide on a line tangential to the arc of rotation of the latch bolt; substantially as described.

14. In a lock, the combination with a casing carrying the operating mechanism adapted to be located on one side of a door; a plate adapted to be located on the opposite side; a socket on one of said members adapted to be engaged by a screw from the other member; and a loosely mounted sleeve surrounding said screw and socket, substantially as described.

15. In a lock, the combination with a latch bolt; of a knob for retracting said latch bolt from the inside of the door; mechanism actuated by a key from the outside for retracting said latch bolt; means for locking said mechanism against operation operated from the inside; and a device for releasing said mechanism upon the retraction of the latch bolt by said inside knob, substantially as described.

16. In a lock, the combination with the casing; of a latch bolt movable in said casing; a lever pivoted in said casing adapted to retract said latch bolt; and a plate engaging the free end of said lever rigidly secured to said casing to prevent the lateral displacement of said lever during its movement, substantially as described.

17. In a lock, the combination with a latch bolt, a deadlocking stop therefor, and a slide carried by the latch bolt, the said slide operating when retracted to release the deadlocking stop and permit the latter to move to its deadlocking position, of key mechanism contained in a separate case and means whereby the operation of the key will move the deadlocking stop out of the path of the latch bolt and retract the bolt.

18. In a lock, the combination with a bolt and means for retracting same, of a slide connected to and carried by the bolt and having a movement independent of the latter, the said slide adapted to be held inwardly by contact with the strike plate or keeper when the door is closed, a deadlocking device engaged by the slide and controlled thereby for deadlocking the bolt, and means actuated by the bolt retracting means for moving the deadlocking device to a position to release the bolt.

19. In a latch, the combination with a bolt and means for retracting same, of a slide connected to and carried by the bolt and having a movement independent thereof, the said slide adapted to be held inwardly by contact with the strike plate or keeper, a spring normally tending to hold said deadlocking means in a position to dead lock the bolt, the said deadlocking means being moved to a position to release the bolt by the engagement therewith of the slide when the door is open, and means adapted when operated by the bolt retracting means, to first move the deadlocking device to a position to release the bolt and then retract the bolt.

20. The combination with a bolt, of a deadlocking lever, a spring normally tending to hold said lever in a position to dead lock the bolt, a slide connected to and carried by the bolt, but free to have a movement independently of said bolt, the said slide adapted to engage the lever and move it to a position to release the bolt when the door is open and to release said lever when the door is closed, and bolt retracting means adapted when actuated to first move the deadlocking device to release the bolt, and then retract the bolt.

21. The combination with a latch bolt, a slide connected to and carried by said bolt, and means for deadlocking the latch bolt, the said means being actuated by the slide, whereby the latch bolt will be deadlocked when the slide is in its retracted position and released when the slide is in the forward position of its movement, and key mechanism for retracting the latch bolt when the slide is in its retracted or forward positions.

22. The combination with a latch bolt and key mechanism comprising a cylinder and means connecting the latter and the bolt, of a lever for dogging the bolt when the latter is in locking position, a device carried by the bolt and having a movement independent of the latter for holding the dogging lever in inoperative position when the door is open, and for releasing it when the door is closed, and means connecting said dogging lever with the key mechanism, whereby the dogging mechanism will be actuated to release the bolt when said key mechanism is actuated.

23. The combination with a latch bolt, and means actuated by the strike plate for automatically dogging the latch bolt when the latter is in its locking position, of key and knob actuated mechanisms for moving the dog out of the path of the bolt and for retracting the bolt, the said key mechanism comprising a key cylinder and means operatively connecting the latter and the bolt, means for locking the key cylinder against rotation, and means for dogging the outer knob.

24. The combination with a latch bolt, knobs and key mechanism comprising a cylinder and means connecting the latter and bolt, means for deadlocking the outer knob, and means for deadlocking the cylinder of the key mechanism, of a lever for dogging the bolt when the latter is in locking position, and means connecting said dogging lever with the key and knobs mechanisms, whereby the dogging lever will be actuated to release the bolt when either of said mechanisms is actuated.

25. The combination with a latch bolt and means for automatically dogging same when the bolt is in its locking position, of key, and inner and outer knob actuated mechanism for moving the dogging mechanism out of the path of the bolt for retracting the bolt, the said key mechanism comprising a key cylinder and means connecting the latter and the bolt, means for preventing the rotation of the key cylinder and dogging means for the outer knob.

26. The combination with a pivoted latch bolt, and a projecting slide carried by said bolt and adapted to be forced inwardly by the bolt and be retained in such position by the keeper, of deadlocking means normally deadlocking the bolt when the door is closed and adapted to be moved to permit the bolt to be retracted, by the outward movement of the deadlocking slide.

27. The combination with a latch bolt and means for automatically dogging same when the bolt is in its locking position, of key and knob actuated mechanism for moving the dogging mechanism out of the path of the bolt for retracting the bolt, the said key mechanism comprising a key cylinder and means connecting the latter and the bolt, means for preventing the rotation of the key cylinder and dogging means for the outer knob.

28. The combination with a bolt, a deadlocking device for the same and a slide connected to and carried by the bolt and engaging the dead-locking device whereby when said slide is in one position, the deadlocking device will be released and be free to rest in its deadlocking position, and when said slide is in its other position it will engage and hold the dead-locking device in its inoperative position, of knob mechanism adapted when actuated to first move the dead-locking device to a position to release the bolt and then retract the latter.

29. The combination with a pivoted latch bolt and its sliding stem, of a slide carried by said stem adapted to be retracted upon the retraction of the latch bolt and capable of independent movement, dead-locking mechanism adapted to engage said latch bolt to prevent its retraction held from such engagement by the releasing slide when in its protracted position, substantially as described.

30. The combination with a pivoted latch bolt and its sliding stem; of a dead-locking lever adapted to prevent the retraction of said stem; longitudinally sliding means carried by said stem and actuated from the strike plate adapted to hold said dead-locking lever in an inoperative position when the door is open, and knob actuated mechanism also engaging said dead-locking lever for releasing same when the knob is turned, substantially as described.

31. The combination with a pivoted latch bolt and its sliding stem; of a dead-locking lever adapted to prevent the retraction of said stem; longitudinally sliding means carried by said stem and actuated from the strike plate adapted to hold said dead-locking lever in an inoperative position when the door is opened, and key actuated mechanism also engaging said dead-locking lever for releasing same when the knob is turned, substantially as described.

32. The combination with a latch bolt, of mechanism for dead-locking said bolt in its protracted position, key actuated mechanism for releasing said dead-locking mechanism and for retracting said bolt, comprising a key cylinder and a connection with said bolt, and a slide for locking said key cylinder against rotation operated from the inside of the door, substantially as described.

33. In a latch, the combination with a bolt and bolt retracting means, of a projecting slide connected to and carried by the bolt and adapted to be held inwardly by contact with the strike plate or keeper, dead locking means for said bolt, a spring normally tending to hold said dead-locking means in the path of the bolt, the said deadlocking means being moved out of the path of the bolt by the engagement therewith of the slide when the door is open, and means adapted when operated by the bolt retracting means to first disengage the dead-locking device from the bolt and then retract the bolt, substantially as described.

34. In a latch, the combination with a latch bolt, and a deadlocking slide connected to and carried by the bolt and adapted to be forced inwardly by the bolt and be retained in such position by the keeper, of deadlocking means always in the path of the bolt when the door is closed, and moved out of the path of the bolt by the outward movement of the deadlocking slide, substantially as described.

35. In a latch, the combination with a latch bolt and a dead locking slide connected to and carried by the bolt and adapted to be forced inwardly by the bolt and retained in such position by the keeper, of deadlocking means always in the path of the bolt when the door is closed, and moved out of the path of the bolt by the outward movement of the deadlocking slide and knob mechanism for disengaging the deadlocking means from the bolt and for retracting the bolt, substantially as described.

36. The combination with a bolt, a deadlocking device for said bolt, and a deadlocking slide connected to and carried by the bolt, of knob mechanism adapted when actuated to first move the deadlocking device from the bolt and then retract the bolt, substantially as described.

37. The combination with a bolt and means for retracting same, of a deadlocking lever, a spring normally tending to hold said lever in the path of the bolt, a deadlocking slide connected to and carried by the bolt and adapted to engage said lever and hold it out of the path of the bolt when the door is open and release said lever when the door is closed, and bolt retracting means adapted when actuated to first disengage the deadlocking device from the bolt and then retract the bolt, substantially as described.

38. The combination with a casing, a bolt and means for retracting the latter, of a deadlocking lever normally resting with one end in the path of the bolt for deadlocking the latter, and a slide connected to and carried by the bolt, and adapted when in its forward position to hold the dogging lever out of the path of the bolt, substantially as described.

In witness whereof, we have hereunto set our hands, on the 19th day of March, 1906.

WILLIAM E. SPARKS.
JOHN H. SHAW.

Witnesses:
WILLIAM H. KIRSCHNER,
KATHRYN M. WALPOLE.